March 18, 1941.  H. W. RIGHTMYER  2,235,117
VEHICLE DOOR LATCH STRUCTURE
Filed March 29, 1937  4 Sheets-Sheet 1
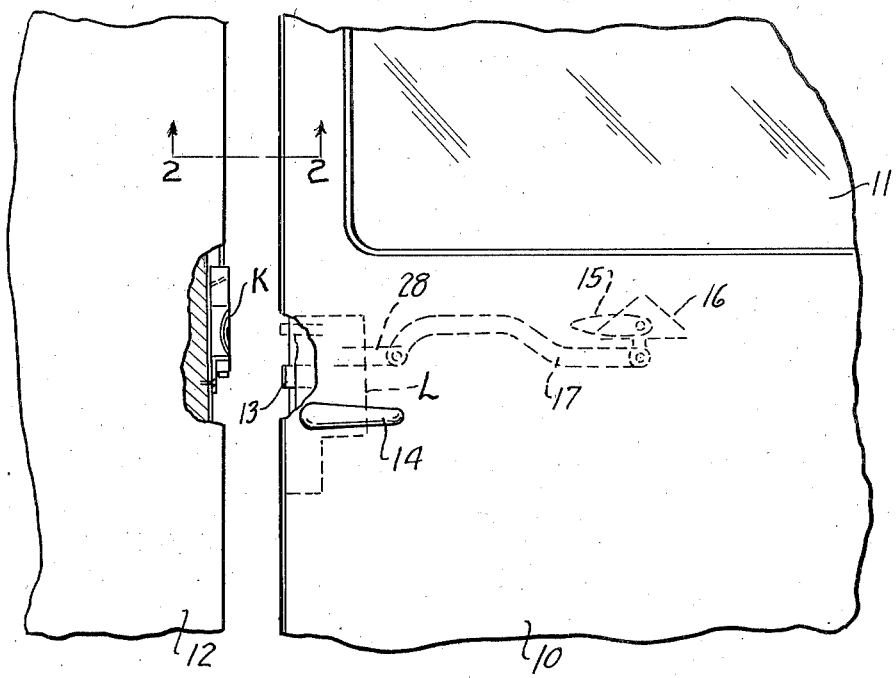
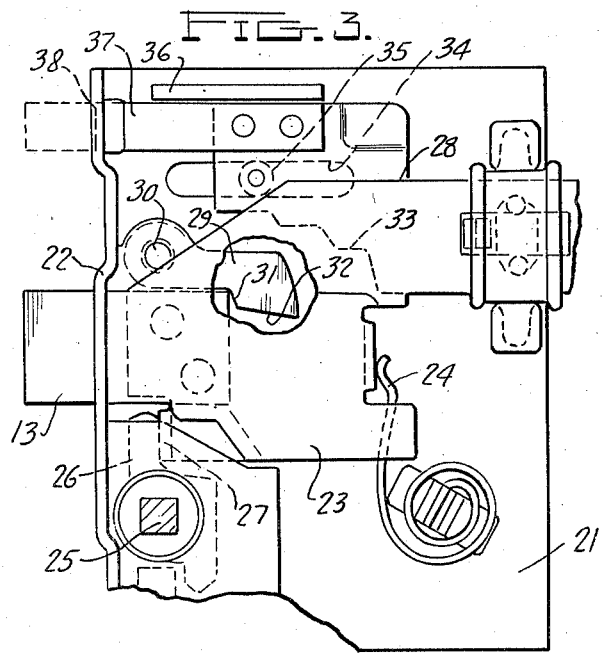
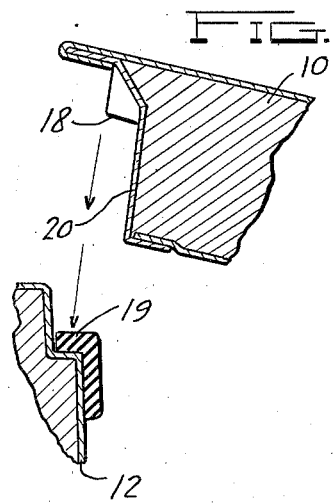
Inventor
Holden W. Rightmyer
By Owen & Owen
Attorneys March 18, 1941.   H. W. RIGHTMYER   2,235,117
VEHICLE DOOR LATCH STRUCTURE
Filed March 29, 1937    4 Sheets-Sheet 2
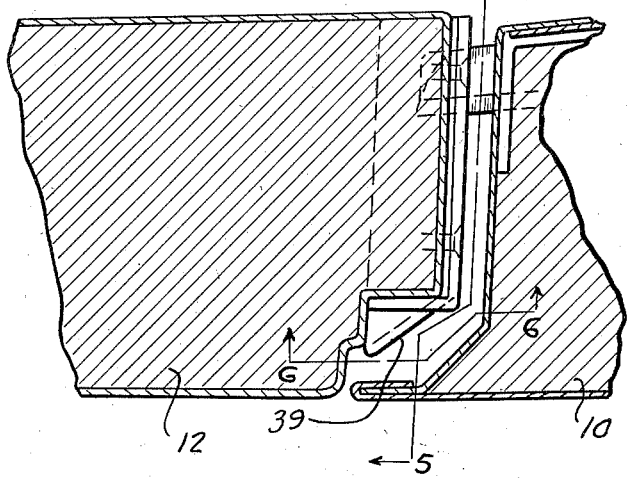
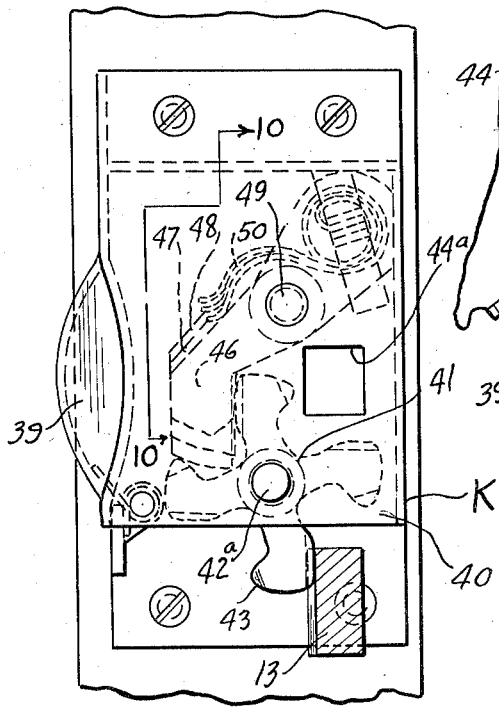
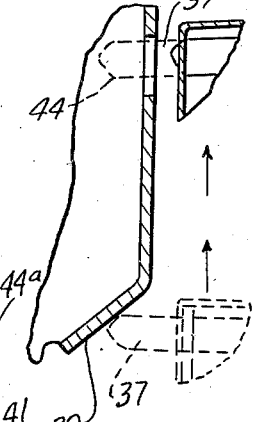
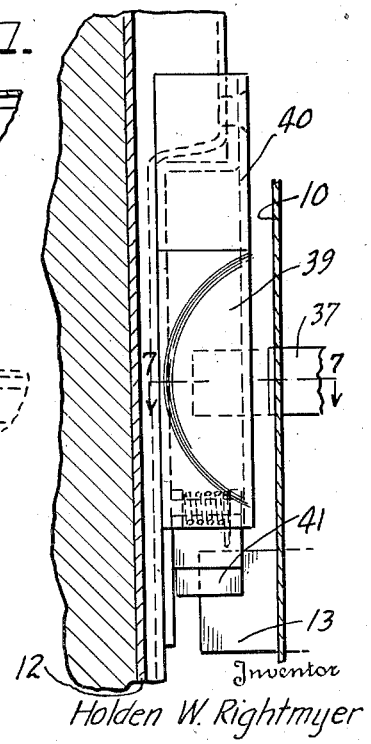
Inventor
Holden W. Rightmyer
By Owen & Owen
Attorneys March 18, 1941. H. W. RIGHTMYER 2,235,117
VEHICLE DOOR LATCH STRUCTURE
Filed March 29, 1937 4 Sheets-Sheet 3
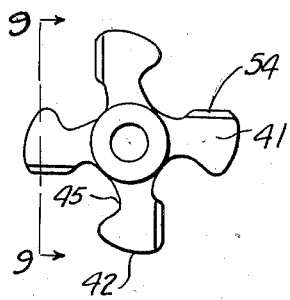
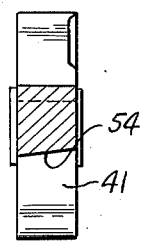
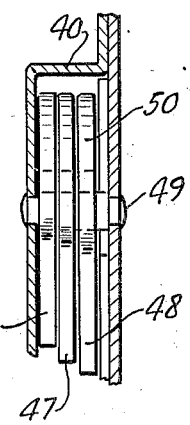
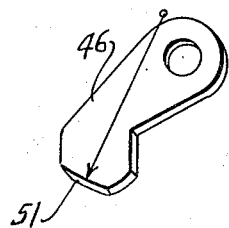
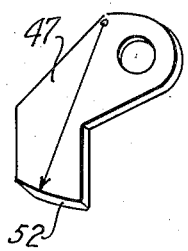
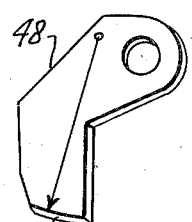
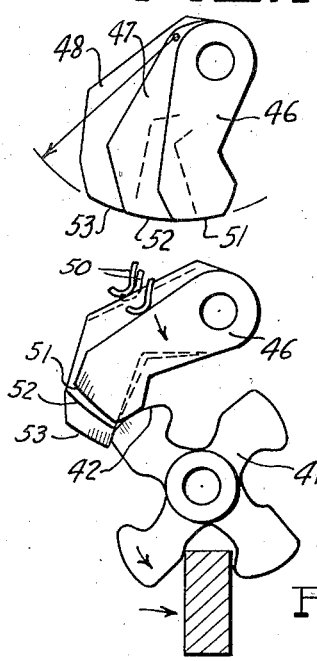
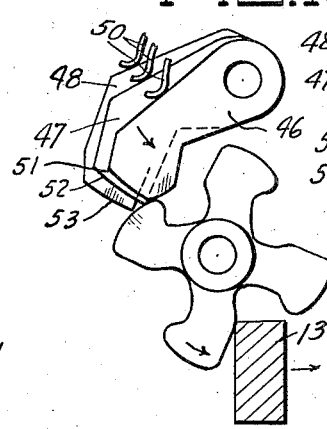
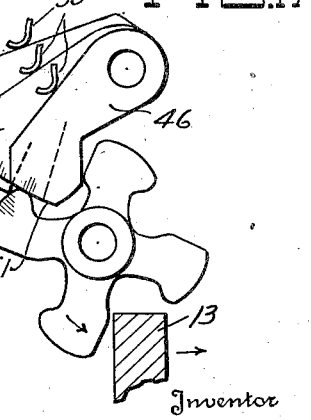
Inventor
Holden W. Rightmyer
Owen + Owen
Attorneys March 18, 1941.  H. W. RIGHTMYER  2,235,117
VEHICLE DOOR LATCH STRUCTURE
Filed March 29, 1937  4 Sheets-Sheet 4
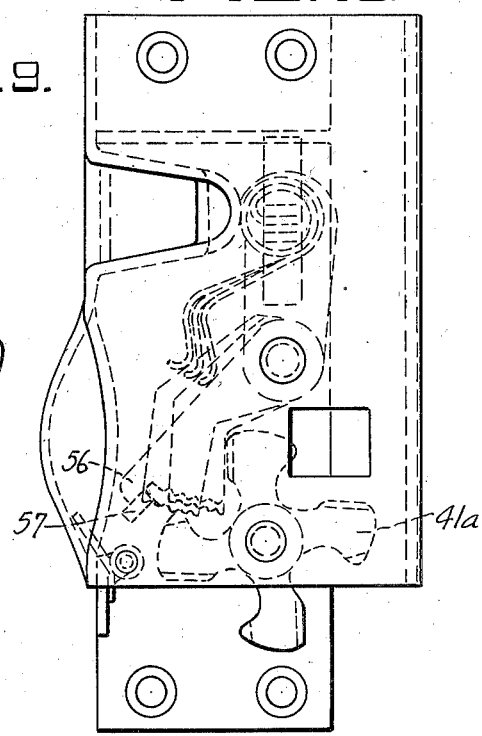
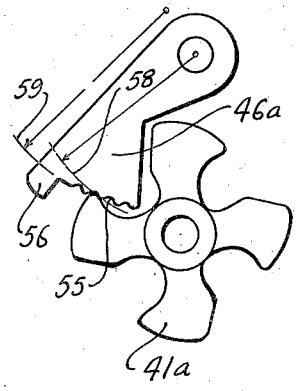
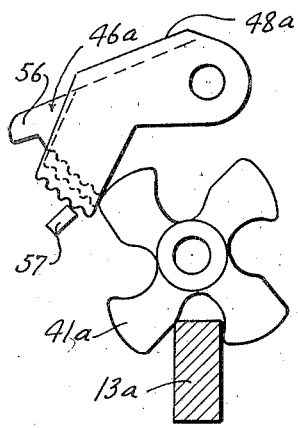
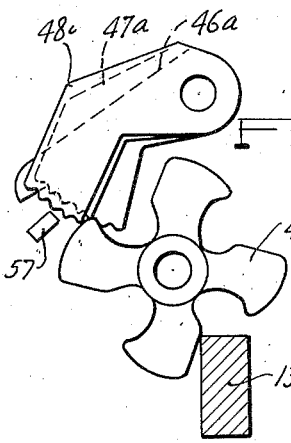
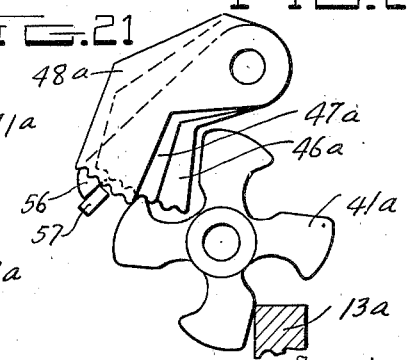
Inventor
Holden W. Rightmyer
By Owen & Owen
Attorneys Patented Mar. 18, 1941

2,235,117

UNITED STATES PATENT OFFICE 2,235,117

VEHICLE DOOR LATCH STRUCTURE

Holden W. Rightmyer, Toledo, Ohio, assignor to The American Swiss Company, Toledo, Ohio, a corporation of Ohio Application March 29, 1937, Serial No. 133,637

2 Claims. (Cl. 292—164)

This invention relates to door latches but more particularly to a door latch for vehicles such as automobiles and an object is to produce a new and improved door latch structure which enables the door to be easily closed and which is effective when the door is in closed position continuously to urge the door into intimate engagement with its support thereby to insure that the door will not only be tightly held closed but also that rattles and other noises will be obviated.

A further object is to produce a simple and efficient door latch and keeper structures which cooperate with each other in enabling the door to be easily and noiselessly closed and continuously urged into snug engagement with its support after being moved to closed position.

Further objects of this invention reside in details of construction, arrangement and operation of the latch and keeper structures, which will hereinafter be described, and, for purposes of illustration, but not of limitation, an embodiment of the invention is shown on the accompanying drawings in which Figure 1 is a fragmentary elevation of an automobile door and its support showing the door ajar and showing in a general way the latch and keeper structures;

Fig. 2 is a fragmentary transverse sectional view on the line 2—2 of Fig. 1 of a portion of the door and the body showing the rubber cushion against which the door is urged when in closed position;

Fig. 3 is a top plan view of the latch structure, the remote control being omitted;

Fig. 4 is an enlarged fragmentary transverse sectional view of a portion of the door and its supporting frame, taken in the region of the latch and keeper structures;

Fig. 5 is a vertical elevation of the keeper structures taken substantially on the line 5—5 of Fig. 4 and showing the latch bolt in engagement with the rotor of the keeper;

Fig. 6 is a sectional elevation substantially on the line 6—6 of Fig. 4 showing a side edge view of a keeper structure;

Fig. 7 is a transverse sectional view on the line 7—7 of Fig. 6, showing in dotted lines the action of the dog releasing finger during the closing of the door;

Fig. 8 is a plan view of the rotor;

Fig. 9 is a sectional view on the line 9—9 of Fig. 8;

Fig. 10 is a vertical sectional view on the line 10—10 of Fig. 5 showing an edge view of the spring tensioned arms which coact with the rotor;

Figs. 11, 12 and 13 are perspective views of the three spring tensioned arms of the keeper respectively;

Fig. 14 is a diagrammatic view of the keeper arm assembly;

Figs. 15, 16 and 17 are diagrammatic views showing the successive operation of the spring tensioned arms indicating the manner in which they successively act against a rotor blade to impart movement to the rotor for urging the latch bolt and door to which it is secured into intimate engagement with the door frame or support;

Fig. 18 is an alternate form of keeper structure;

Fig. 19 is a side elevation of one of the arms and the rotor showing diagrammatically the results secured by the use of notches formed in the cam surface of the arms; and Figs. 20, 21 and 22 are diagrammatic views, similar to Figs. 15, 16 and 17 respectively, showing the position of the rotor and arms in various positions of the bolt.

This application constitutes a continuation in part of my application Serial No. 121,433, filed January 21, 1937, and entitled "Vehicle door latch structure."

The illustrated embodiment of the invention comprises a vehicle door 10 having a window 11 which is suitably mounted for swinging movements to and from closed position relative to a frame or support 12. The latch mechanism is generally indicated at L and has a projecting bolt nose 13 which coacts with the keeper structure K mounted on a vertical edge of the support 12. From the outside of the door the bolt nose 13 is retracted by a handle 14 and on the inside of the door a handle 15 is suitably supported by a bracket plate 16 and is operatively connected through the medium of an elongate link 17 to the latch structure L. It will be apparent to those skilled in this art that the bolt nose 13 may be retracted by operation of the inside handle 15 or the outside handle 14 to free it from the keeper K.

Fig. 2 shows in greater detail the swinging door 10, such as used on automobiles, and which swings to and from engagement with the body or support 12. In this instance, a shoulder 18 is formed on the door 10 and has a vertical face which abuts against a rubber cushion 19 which is L-shaped in cross section, one portion of the cushion being engaged by a surface 20 of the door and being wedged tightly between that surface and the body. As will hereinafter appear, the door 10 is continuously urged into intimate engagement with the cushion 19 thereby to eliminate rattle and vibration and securely hold the door closed.

The latch structure L which is best shown in Fig. 3 comprises a case plate 21 having a flange 22 at the front edge which is apertured to receive the bolt nose 13. The bolt nose 13 is riveted to a bolt plate 23 which is urged to latching position with the latch bolt projected, by a spiral spring 24. The latch bolt is retracted from the outside of the door by the handle 14 which has a shaft 25 square in cross section and which fits into the hub of a roll back 26. The roll back 26 engages a shoulder 27 on the bolt plate 23. The remote control link 17 is pivotally connected at its front end to a slide 28 which has a lost motion connection with the bolt plate 23 so that when the link 17 is moved to the right of Fig. 1, the latch bolt is retracted against the force of the spring 24.

In this instance, the latch bolt may be blocked preventing it from being retracted by a dog 29 which is pivoted at one end to the case plate 21 at 30. The dog 29 has an inclined surface 31 which is adapted to engage the rear edge of the bolt nose 13. Adjacent the surface 31 is an inclined or cam surface 32 so that when the dog is free, retracting movement of the latch bolt operates to swing the dog upwardly out of operative position.

The dog 29 is retained in blocking position by the end portion 33 of the slide 28 which is shaped to snugly fit the dog 30 and prevent or block its upward swinging movement. The case plate 21 is provided with an elongate slot 34 to receive a stud 35 which depends from the front end portion of the slide 28 and thereby guides the movements of the slide. Disposed above the upper edge of the slide 28 is a lug 36 which is adapted to receive a portion of the thrust from the dog 29 which the slide is in position to block movement of the dog.

Riveted to the slide 28 is a finger 37 which is adapted to extend through an opening 38 in the flange 22 of the case plate when the slide 38 is advanced to block movement of the dog 29. The purpose of the finger 37 is to enable the bolt to be released upon shutting of the door. Thus, if the inside handle 15 were moved in non-bolt-retracting direction to advance the slide 28 into dog engaging position with the door open, unless some means were provided, the door would be locked and without the use of a key mechanism, the person would be locked out of the car. By providing the finger 37 which affords slam-unlocking, the dog 29 is automatically released when the door is slammed shut.

Attention is directed to Figs. 6 and 7 which illustrate the operation of the finger 37 when the door is closed. Provided on the keeper structure K is a cam surface 39 against which the finger 37 engages when the door is closed. As the finger 37 moves along the surface 39, it is cammed inwardly as will be readily apparent.

The keeper structure K is generally shown on Fig. 5 and comprises a housing 40 which is suitably secured to a vertical portion of the support or frame 12 which has been suitably recessed to receive it. Mounted on the housing 40 is a rotor 41 which is free to rotate upon a bearing pin 42ᵃ. In this instance, the rotor 41 has four equi-distantly spaced blades. The outer peripheral surface of each of the blades is especially designed to provide an arcuate cam surface 42 which has its highest point adjacent the forward edge in the direction of rotational movement for a purpose hereinafter described. In advance of this surface the forward portion of each plate has a bevelled surface 43 which provides a safety feature so that in the event that one of the blades is in the path of movement of the finger 37 when the latter is projected from the face of the latch supporting plate 21, the rotor will be cammed out of the way by engagement between the beveled surface 43 of the rotor blade and the inclined surface 44 formed at the outer end of the finger 37. An opening 44ᵃ is provided in the keeper housing 40 to receive the finger 37 when the latter is projected while the door is in closed position. The rear face of each of the rotor blades has an undercut or grooved portion 45 for a purpose which will hereinafter appear.

One of the blades of the rotor 41 is adapted to extend through an opening in the housing 40 in the path of swinging movement of the bolt nose 13 and when engaged by the bolt nose it imparts counter-clockwise movement to the rotor (Fig. 5). Coacting with the rotor 41 are a plurality of arms, in this instance three arms 46, 47 and 48 being provided. These arms are mounted on a common pivot 49 and are yieldingly urged toward the rotor by springs 50, one spring being provided for each of the arms. The structure of the arms 46, 47 and 48 is of utmost importance in order to obtain the desired result which is to urge the rotor in a counter-clockwise direction after first being acted upon by the bolt nose 13 so that a continuous and uninterrupted force is exerted against the rotor for forcing the door against the rubber cushion 19 with a uniform pressure. The advantage of this operation will be apparent in that even after the door is closed against the rubber cushion 19, a force is thereafter urging the door into more intimate engagement with such cushion. Thus the door can not only be closed easily and with practically no noise but in addition, it is much more securely held in closed position against rattles and vibration than in locks heretofore in use. The arms 46, 47 and 48, as will hereinafter be described, operate successively and uninterruptedly so that after the camming action of one arm has about become completed, another arm will have commenced its camming action and so on until the door is completely closed.

An examination of Figs. 11, 12 and 13 will show the difference in contour of the several arms. Attention is directed to the arrow lines on each figure which indicate the points from which the arcs have been taken to arrive at the proper cam surfaces. In the form shown, the arm 46 is first brought into play. After the high point on the peripheral surface of the particular rotor blade has been passed by the arm 46, its cam surface is brought into play and through the force of its spring 50, a camming action is exerted against the engaged surface of the particular rotor blade. During this time, the arms 47 and 48 ride over the peripheral surface of the rotor blade. After the camming action of the arm 46 is about completed, the cam surface of the arm 47 commences operation and then substantially at the time the camming action of the surface 52 is completed, the cam surface 53 of the arm 48 is brought into operation.

Attention is directed to Fig. 14 which diagrammatically illustrates the manner in which the cam surfaces 51, 52 and 53 coincide with each other. Thus, after the cam surface 51 has operated to cam the rotor 41 for a short distance, then without any interruption in the camming action, the cam surface 52 of the arm 47 is brought into play and then without any further interruption, the cam surface 53 of the arm 48 becomes operative immediately after the surface 52 has been passed over. As above indicated, it is of real importance that the arcs of these cam surfaces coincide with each other to effect a smooth and uninterrupted camming action against the rotor blade.

Preferably, the parts should be so constructed and arranged that when the door has been completely closed against the rubber cushion 19, all of the arms will not have expended their camming action but on the contrary, it is more desirable that some camming action of these arms or at least one of them be utilized to continuously urge the rotor in a counterclockwise direction so that pressure is exerted against the bolt nose 13 thereby to secure more intimate engagement with the rubber cushion 19. Due to the jars and shocks of the vehicle during road travel, the tendency is for the door to be urged even more tightly against its frame or support 12.

The face 54 of each of the blades of the rotor 41 which engages the bolt nose 13 is constructed at such an angle to the rest of the rotor that a sizable surface of the bolt will be engaged instead of merely a point contact (Fig. 9). This is of advantage in reducing wear on the parts as much as possible.

The alternate form of keeper structure shown on Figures 18 to 22 is similar to that hereinbefore described and detailed description thereof is not considered necessary except in connection with the changes in construction. As in the above described form, three spring tensioned camming arms are employed, these being identified by the numbers 46ª, 47ª and 48ª. These arms have camming surfaces similar to the surfaces 51, 52 and 53 above described but on each of these surfaces are formed a series of notches 55 for a purpose hereinafter described. Also it will be observed that the arm 46ª on its rearward or inner end is formed with an outwardly projecting finger 56 which is engageable with a lug 57 projecting laterally from the keeper housing. The engagement of the finger 56 and lug 57 is of importance in preventing the spring which actuates the arm 46ª from actuating it beyond the effective camming period and imparting a force to the rotor 41ª urging it in the opposite direction. It will be understood that the arm 46ª is first brought into operation and unless some means is provided for limiting the pivotal movement of this arm after it has exerted its camming action against one of the blades of the rotor it will move inwardly against the preceding blade and impart thereto a force tending to turn the rotor in a direction opposite to that desired.

Referring to Fig. 19, it should be noted that the notches, the number of which in each arm or blade may be varied as desired, are preferably shallow in order that they do not interfere materially with the camming action of the individual arms. It will be understood that the notches 55 successively contact a blade of the rotor against which camming action is being imparted and the grooves serve to prevent the rotor from being rotated or turned in a direction opposite to that desired for holding the bolt in its raised or closed position. It has been found that at times in cases where the notches have been omitted that if the force exerted by the bolt 13ª in a door-opening direction is sufficiently great, it will cause the rotor to cam the arms out of the way and permit the door to be released from the rotor. The function of the notches 55 may be described as follows: on Fig. 19 an arc 58 is scribed from the axis of the arm 46ª. The line 59 represents the arc of the cam surface of the arm 46ª. It will be apparent that the arc 59 in the direction of camming action of the arm 46ª is of constantly increasing radii. It will be apparent that if the reverse force of the rotor 41ª exceeds that of the spring acting against the arm 46ª, it would be enabled to rotate in a clockwise direction (Fig. 19) and guide the arm in a clockwise direction. However, to counteract this action, the pointed portion of the rotor 41ª engages in one of the shallow notches 55 so that the force exerted by the rotor is directly in line with the axis of the arm 46ª thereby preventing such reverse camming action. Each notch 55 should either be substantially tangent to the arc 58 or extend inwardly toward the center of the axis so that the reverse force imparted by the rotor is substantially in line with the axis of the arm 46ª. It will be understood that the above described action takes place in connection with the notches of each of the arms but the above description is deemed sufficient. The action of the arms with respect to the rotor will be apparent from inspection of Figures 20 to 22 and except for the above changes in construction, the arms and rotor operate as hereinbefore described.

It is to be understood that numerous changes in details of construction, arrangement and operation may be effected without departing from the spirit of the invention especially as defined in the appended claims.

What I claim is:

1. A vehicle door latch comprising a spring tensioned latch bolt, inside and outside retractors for said latch bolt, said inside retractor including a plate having lost motion relative to said bolt when the latter is in latching position, a dog engageable with said bolt for blocking retracting movement thereof, means on said dog engageable with the bolt upon retraction thereof for moving same out of operative engagement with said bolt, means actuated by said plate for blocking movement of said dog out of operative position relative to said bolt, and means movable with said plate adapted to project from the latch when said dog blocking means is in operative position, and movable inwardly upon slamming of the door for moving said dog blocking means to inoperative position.

2. A vehicle door latch comprising a spring tensioned latch bolt, inside and outside retractors for said latch bolt, said inside rectractor including a plate having lost motion relative to said bolt when the latter is in latching position, a pivotal dog engageable with said bolt for blocking retracting movement thereof, means on said dog engageable with the bolt upon retraction thereof for moving same out of operative engagement with said bolt, means actuated by said plate for blocking movement of said dog out of operative position relative to said bolt, and a sliding finger movable with said plate adapted to project from the latch when said dog blocking means is in operative position, and movable inwardly upon slamming of the door for moving said dog blocking means to inoperative position.

HOLDEN W. RIGHTMYER.